United States Patent

Nicholas et al.

Patent Number: 5,772,520
Date of Patent: ***Jun. 30, 1998

[54] VENTED STUDYOKE ON SLIP-BETWEEN-CENTER DRIVESHAFT

[75] Inventors: Chris Peter Nicholas, Berkley; Timothy Peter Raleigh, Macomb Township, both of Mich.

[73] Assignee: Ford Motor Company, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 678,128

[22] Filed: Jul. 11, 1996

[51] Int. Cl.⁶ .......................................... F16C 3/03

[52] U.S. Cl. .............. 464/162; 464/7; 464/175; 137/580; 251/335.3

[58] Field of Search .................... 464/162, 175, 464/173, 7; 137/580; 251/335.3

[56] References Cited

U.S. PATENT DOCUMENTS

| | | |
|---|---|---|
| 1,541,007 | 6/1925 | Theimer . |
| 1,756,335 | 4/1930 | Bijur . |
| 1,973,702 | 9/1934 | Cooke . |
| 3,063,266 | 11/1962 | Rabson ................................ 464/175 X |
| 3,242,695 | 3/1966 | Ross, Jr. .............................. 464/162 X |
| 3,455,122 | 7/1969 | Greenberg ........................... 464/162 X |
| 3,813,899 | 6/1974 | Abrahamer ......................... 464/162 X |
| 4,131,188 | 12/1978 | Charchian . |
| 4,308,729 | 1/1982 | Condon . |
| 4,475,737 | 10/1984 | Cook, Jr. et al. . |
| 4,592,556 | 6/1986 | Nieman et al. . |
| 4,728,777 | 3/1988 | Guarr . |
| 4,819,755 | 4/1989 | Smemo et al. . |
| 5,071,390 | 12/1991 | Latshaw ....................................... 464/7 |
| 5,439,029 | 8/1995 | Becker ................................... 137/580 |

FOREIGN PATENT DOCUMENTS

| | | | |
|---|---|---|---|
| 2257042 | 8/1975 | France .................................... 464/175 |
| 152931 | 9/1983 | Japan ..................................... 464/175 |
| 403153421 | 7/1991 | Japan ..................................... 464/162 |

*Primary Examiner*—Donald P. Walsh
*Assistant Examiner*—Emmanuel M. Marcelo
*Attorney, Agent, or Firm*—James J. Dottavio

[57] ABSTRACT

A vented slip joint assembly includes a first shaft with a first end having an externally splined portion. A second internally splined shaft is drivably connected at a first end to the first shaft. A seal sealingly engages the first shaft and the first end of the second shaft. A vent is provided in the first shaft to provide fluid communication to the second end of the first shaft.

13 Claims, 1 Drawing Sheet

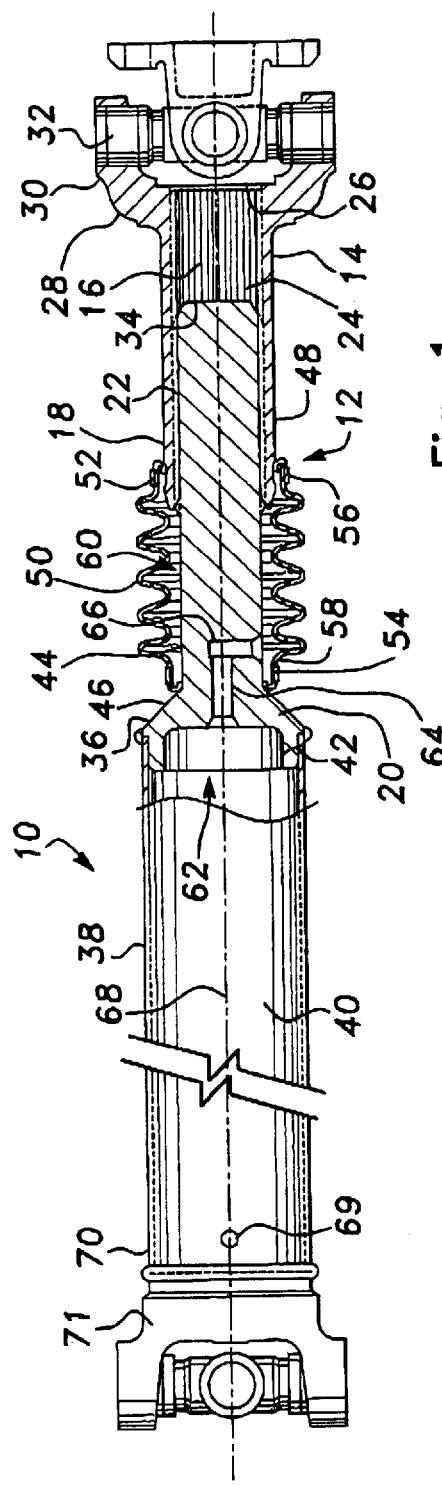
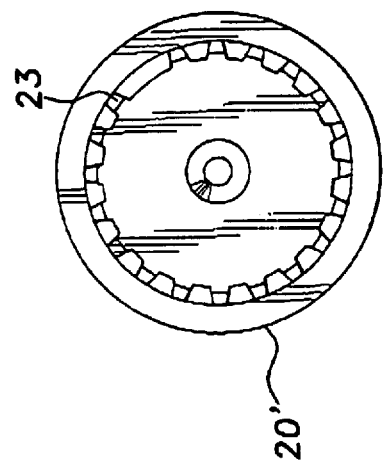
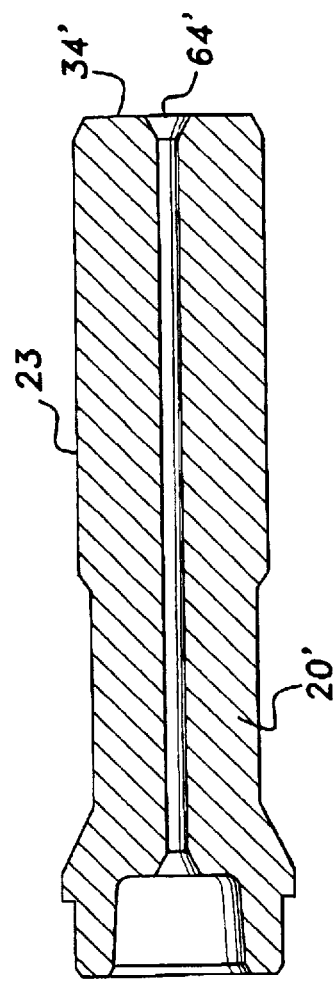
Fig-1
Fig-2
Fig-3

VENTED STUDYOKE ON SLIP-BETWEEN-CENTER DRIVESHAFT

BACKGROUND OF THE INVENTION

1. Field of the Invention

The present invention relates to a vented studyoke for an automotive driveline assembly.

2. Description of the Prior Art

In the driveline of a motor vehicle, displacement along the axis of rotation of the driveline occurs within the driveline. To accommodate the axial displacement, slip joints are provided within the driveline. These slip joints typically comprise an external splined shaft slidably received in a splined bore of a second shaft. The axial movement of the splined shaft within the splined bore compresses air within the splined bore. The splined connection is lubricated to reduce friction and to permit free movement of the splined connection. Seals are provided at either end of the splined bore to prevent contamination of the lubricant. Air between the splined shaft and the seals is compressed upon axial movement of the splined shaft.

U.S. Pat. No. 4,475,737 to Cook, et al provides a hole in the end of a cap provided at one end of the splined bore opposite the splined shaft. The design provided in the '737 patent thereby provides a means for compressed air to escape through the hole when the splined shaft moves in the bore toward the capped end. However the '737 patent provides no escape for air at the end of the splined bore opposite the cap. Furthermore the hole in the cap of the '737 patent may permit ingress of contaminants into the lubricant zone.

It would therefore be desirable to provide a splined connection having a vent for escape of compressed air in a manner which enables escape of compressed air at the end of the splined connection opposite the cap and which does not enable ingress of contaminants into the lubricant between the splined connection.

SUMMARY OF THE INVENTION

It is an object of this invention to provide a splined connection having a vent for escape of compressed air in a manner which does not enable ingress of contaminants and which vents air from the end of the splined connection opposite the cap.

In realizing these objects, a vented slip joint assembly is provided having a first shaft with a first end with an externally splined portion. A second internally splined shaft is drivably connected at a first end to the first shaft. A seal sealingly engages the first shaft and the first end of the second shaft. A vent is provided in the first shaft to provide fluid communication to the second end of the first shaft.

BRIEF DESCRIPTION OF THE DRAWINGS

FIG. 1 is a partial cross sectional view of a studyoke assembled to a driveshaft according to the present invention.

FIG. 2 is a side view of an alternative embodiment of a studyoke according to the present invention.

FIG. 3 is an end view of a studyoke according to the embodiment shown in FIG. 2.

DESCRIPTION OF THE PREFERRED EMBODIMENTS

In the driveline of a motor vehicle, the driveshaft assembly 10 includes a slip joint 12 to accommodate axial movement of the driveline. Typically the slip joint 12 comprises a slipyoke 14 having a splined bore 16 at a first end 18 for slidably receiving an externally splined studyoke 20. Lubricant (not shown) is provided between the mating sliding splined portions 22, 24. A plug 26 is provided at the second end of the slipyoke 14 opposite the studyoke 20. The plug 26 retains the lubricant within the bore 16 and prevents ingress of contaminants. This cap 26 may be solid, or vented as shown in U.S. Pat. No. 4,475,737 to Cook, et al.

The slipyoke 14 has an internally splined 24 bore 16 for sliding connection with the studyoke 20. The second end 28 of the slipyoke 14 has a flange 30 for connection to a universal joint 32 or flexible coupling (not shown) as is known in the art. The opposite end 18 of the slipyoke 14 comprises an axial elongate tubular portion having the internally splined section 24 which engages the externally splined 22 studyoke 20.

The studyoke 20 has a first end 34 with a splined outer diameter 22 for driving engagement with the slipyoke 14 and further for permitting axial relative movement of the studyoke 20 to the slipyoke 14. The second end 36 of the studyoke is welded to a driveshaft 38. The driveshaft 38 includes a hollow bore 40. The second end 36 of the studyoke 20 has a cup-shaped internal portion 42. Intermediate the cup shaped portion 42 and the splined portion 22 of the studyoke 20 is a cylindrical outer diameter 44 on the studyoke 20.

A boot seal 50 is provided at the first end 18 of the slipyoke 14 adjacent the studyoke 20 to prevent contamination of the lubricant. The boot seal 50 engages the outer diameter 48 of the slipyoke 14 and is typically sealed by providing a clamp 52 on the outer portion of the boot 50 at a first end 56 of the boot 50 to clamp the boot seal 50 to the slipyoke 14. A second end 58 of the boot seal 50 is likewise clamped at the second end 58 using a second clamp 54 to clamp the boot 50 over the outer diameter 44 of the studyoke 20. A cavity 60 is therefore created between the outer diameter 44 of the studyoke 20 and the boot 50; the cavity bounded at either end by the clamped portions 56, 58 of the boot 50. A shoulder 46 is provided on the studyoke 20 adjacent the boot 50 to prevent sliding of the boot 50 and to provide an enlarged portion for engagement with the driveshaft 38.

As the studyoke 20 moves axially relative to the slipyoke 14, pressure builds up in the cavity 60 between the boot 50 and the studyoke 20. To relieve this pressure, a vent 62 is provided in the studyoke 20 between the cavity 60 and the second end 36 of the studyoke 20. The vent 62 comprises an axial bore 64 in the studyoke 20 drilled from the second end 36. A radial bore 66 is provided perpendicular the axis of rotation 68 of the studyoke 20. The radial bore 66 intersects the axial bore 64 to provide for fluid communication from the cavity 60 between the boot 50 and the studyoke 20 to the cup-shaped end 42 of the studyoke 20. As shown in FIG. 1, both the first and second bores 64, 66 are blind holes in the studyoke 20.

In the alternative embodiment shown in FIG. 2, the axial bore 64', extends through the entire length of the studyoke 20'. Thus when air is compressed between the first end 34' of the studyoke 20' in the internal bore 16 of the slipyoke 14, the compressed air escapes through the bore 64' into the inside of the tubular portion of the driveshaft 40 shown in FIG. 1. Thus the air is compressed inside a larger volume and less resistance is provided against the movement of the studyoke 20. Furthermore, one or more of the spline teeth 23 may be omitted from the studyoke 20' as shown in FIG. 3, and/or omitted from the slipyoke 14 (not shown). The omitted spline tooth 23 creates an axial channel between the studyoke 20 and the slipyoke 14. The omitted spline tooth 23 thus permits the compressed air in the cavity 60 under the boot 50 to escape between the shafts to the first end of the studyoke 34 and further to escape through the axial bore 64' in the into the cavity 40 of the driveshaft 38. Alternatively, the studyoke 20' could have a radial bore (not shown) similar the radial bore 66 shown in FIG. 1 to communicate the cavity 50 to the through bore 64'.

In a further alternative embodiment, an aperture 69 may be provided at the second end of the driveshaft 70 opposite the studyoke 20 to permit the air to escape from the driveline entirely. Alternatively, the aperture 69 may be provided in the universal joint flange 71 at the second end 70 of the driveshaft 38. By distancing this hole 69 from the slip joint 12, ingress of contaminants into the area containing the lubricant is less likely.

By providing for the escape of the compressed air, installation of the studyoke 20 into the slipyoke 14 is more easily performed, as less resistance will be presented during assembly. Furthermore, there is less resistance during operation of the vehicle for the axial movement of the driveshaft 10. Balancing of the driveline may therefore be more precisely obtained.

The above description is directed toward the driveshaft in a rear wheel drive vehicle. However, one skilled in the art recognizes any plunging splined connection may use these same principles. For example, a plunging constant velocity (CV) joint could have a similar vent and thereby provide relief for the compressed air during the plunge of the CV joint.

Although the preferred embodiment of the present invention have been disclosed, various changes and modifications may be made without departing from the scope of the invention as set forth in the appended claim.

What is claimed is:

1. A vented slip joint assembly comprising:
    A first shaft having an outer surface and a first end with an externally splined position;
    a second shaft having a first end with an internally splined portion, a cap at a second end thereof to form a first cavity inside the second shaft, the splined portion of the second shaft drivably connected to the splined portion of the first shaft;
    a seal having an inner surface, the seal sealingly engaged with the first and second shafts to define a second cavity bounded by the outer surface of the first shaft, the inner surface of the seal, and the first end of the second shaft, and the seal further defining a third cavity including the first cavity of the second shaft, the inner surface of the seal, and the outer surface of the first shaft; and
    a vent provided in the first shaft, the vent having a first end in fluid communication with the second cavity, the vent extending through the first shaft, and having a second end in fluid communication outside the third cavity.

2. A slip joint assembly according to claim 1, wherein the vent comprises:
    one of the internally and externally splined portions having a spline removed to accommodate fluid communication between the second cavity under the seal and the first cavity between the cap and the first end of the first shaft; and
    said first shaft having an axial bore therethrough for fluid communication between the first cavity through the first shaft outside the third cavity.

3. A slip joint assembly according to claim 2, wherein the seal comprises a rubber boot secured to the first and second shafts to form the second cavity therebetween.

4. A slip joint assembly according to claim 1, wherein the vent comprises said first shaft having a bore provided therein, the bore having a first end in fluid communication with the second cavity under the seal, the bore providing fluid communication through the first shaft, and a second end for fluid communication outside the third cavity.

5. A slip joint assembly according to claim 4, wherein the bore further comprises an axial bore from a second end of the first shaft in fluid communication outside the third cavity and a radial bore in fluid communication between the axial bore and the second cavity under the seal.

6. A vented slip joint assembly comprising;
    a first shaft having a first end with an externally splined portion and a second end;
    a hollow driveshaft having a first cavity within the drive shaft, the driveshaft drivably connected to the second end of the first shaft;
    a second shaft having a internally splined portion drivably connected to the splined portion of the first shaft;
    a seal sealingly engaged with the first and second shafts to define a second cavity bounded by the seal and the first and second shafts; and
    a vent provided in the first shaft, the vent having a first end in fluid communication with the second cavity, the vent extending through the first shaft and having a second end in fluid communication with the first cavity of the driveshaft.

7. A slip joint assembly according to claim 6, wherein the vent comprises:
    a third cavity defined by the internally splined portion of the second shaft and the first shaft;
    one of the internally and externally splined portions having a spline removed to accommodate fluid communication between the second cavity and the third cavity; and
    said first shaft having an axial bore therethrough with a first end in fluid communication with the third cavity, the bore extending through the first shaft and having a second end in fluid communication with the first cavity.

8. A slip joint assembly according to claim 6, wherein the vent comprises said first shaft having a bore provided therein, the bore communicating at a first end with the second cavity under the seal, the bore extending through the first shaft, and the bore having a second end in fluid communication with the first cavity.

9. A slip joint assembly according to claim 8, wherein the bore comprises an axial bore from a second end of the first shaft, the axial bore having a first end in fluid communication with the first cavity and a second end in fluid communication with a radial bore provided in the first shaft, the radial bore having a first end in fluid communication with the axial bore and a second end in fluid communication with the second cavity under the seal.

10. A slip joint assembly according to claim 6, wherein the seal comprises a rubber boot secured to the first and second shafts to define the second cavity therebetween.

11. A method of venting a slip joint assembly comprising;
    providing a first shaft having a first end with an externally splined portion;
    providing a second shaft having a closed first end with an internally splined portion defining a first cavity therein, the second shaft drivably connected to the first end of the first shaft;

providing a seal to sealingly engage the first and second shafts to create a second cavity therebetween defined by the seal and the first and second shafts; and providing a vent in the first shaft having a first end in fluid communication with the second cavity and a second end in fluid communication outside the first and second cavities.

12. A method according to claim 11, wherein the vent is provided by removing a spline from one of the shafts to provide fluid communication between the first and second cavities and providing an axial bore through the first shaft to provide fluid communication outside the first and second cavities.

13. A method according to claim 11, wherein the vent is provided by:

providing an axial bore in the first shaft at a second end opposite the first end, the axial bore having a first end in fluid communication outside the first cavity; and providing a radial bore in the first shaft, the radial bore having a first end in fluid communication with the second cavity and a second end in fluid communication with the axial bore.

\* \* \* \* \*